(12) United States Patent
Zhang et al.

(10) Patent No.: US 8,891,592 B1
(45) Date of Patent: Nov. 18, 2014

(54) CONTROL PHYSICAL LAYER (PHY) DATA UNIT

(75) Inventors: Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 949 days.

(21) Appl. No.: 12/901,287

(22) Filed: Oct. 8, 2010

Related U.S. Application Data

(60) Provisional application No. 61/252,286, filed on Oct. 16, 2009.

(51) Int. Cl.
H04B 1/00 (2006.01)

(52) U.S. Cl.
USPC ........... 375/149; 375/145; 375/260; 375/343; 375/349

(58) Field of Classification Search
USPC ................. 375/130–137, 259–261, 267, 271, 375/279–285, 295–296, 299, 302, 308, 316, 375/324–325, 329–332, 340, 346–350
See application file for complete search history.

(56) References Cited

U.S. PATENT DOCUMENTS

| | | | | |
|---|---|---|---|---|
| 8,165,185 | B2 * | 4/2012 | Zhang et al. | 375/135 |
| 8,477,813 | B2 * | 7/2013 | Zhang et al. | 370/510 |
| 8,527,853 | B2 * | 9/2013 | Lakkis | 714/783 |
| 8,599,900 | B2 * | 12/2013 | Zhang et al. | 375/135 |
| 2003/0137966 | A1 * | 7/2003 | Odman et al. | 370/347 |
| 2008/0298435 | A1 * | 12/2008 | Lakkis | 375/140 |
| 2009/0109945 | A1 * | 4/2009 | Lakkis | 370/338 |
| 2010/0118835 | A1 * | 5/2010 | Lakkis et al. | 370/336 |
| 2010/0227561 | A1 * | 9/2010 | Chakraborty et al. | 455/63.1 |
| 2010/0265895 | A1 * | 10/2010 | Bracha | 370/329 |
| 2012/0311410 | A1 * | 12/2012 | Lakkis | 714/783 |

FOREIGN PATENT DOCUMENTS

WO WO 2009/059229 5/2009

OTHER PUBLICATIONS

"IEEE 802.15.3™ Guide Addresses Untapped High-Rate Wireless Personal Area Network (WPAN) Market," *The Institute of Electrical and Electronics Engineers, Inc.*, available at http://standards.ieee.org/announcements/pr_802153wpanguide.html (2004).

IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2008).

(Continued)

*Primary Examiner* — Sam K Ahn
*Assistant Examiner* — James M Perez

(57) ABSTRACT

In a wireless communication system where communication devices exchange information utilizing physical layer (PHY) data units that conform to a first format, where the first format includes a short training field (STF) that includes exactly N repetitions of a spreading sequence, a method for generating a PHY data unit that conforms to a second format, where the second format has a longer STF than the first format, includes generating an STF of the PHY data unit that includes M instances of the spreading sequence, where M is greater than N, and generating a channel estimation field (CEF).

13 Claims, 7 Drawing Sheets

(56) References Cited

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

U.S. Appl. No. 12/569,547, "Efficient Physical Layer Preamble Format," filed Sep. 29, 2009, Hongyuan Zhang et. al.

Harada, "Project: IEEE P802.15 Working Group for Wireless Personal Area Network (WPANs), " IEEE 802.15-07-0693-003c (May 2007).

Abstract of M.P. Wylie-Green et al., "Multi-band OFDM UWB solution for IEEE 802.15.3a WPANs," 2005 IEEE/Sarnoff Symposium on Advances in Wired and Wireless Communication, pp. 102-105 (Apr. 2005).

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.*(2009).

IEEE Std 802.15.4™-2011 (Revision of IEEE Std 802.15.4-2006) "IEEE Standard for Local and metropolitan area networks—Part 15.4: Low-Rate Wireless Personal Area Networks (LR-WPANs)," *The Institute of Electrical and Electronics Engineers Inc.*(Sep. 5, 2011).

Pyo et al., "Throughput Analysis and Improvement of Hybrid Multiple Access in IEEE 802.13.3c mm-wave WPAN," IEEE J. on Selected Areas in Communications, vol. 27, No. 8, pp. 1414-1424, Oct. 1, 2009. [corrupted copy (pp. 1422 and 1424)].

\* cited by examiner

CONTROL PHYSICAL LAYER (PHY) DATA UNIT

CROSS REFERENCE TO RELATED APPLICATIONS

This application claims the benefit of U.S. Provisional Patent Application No. 61/252,286, entitled "Control PHY Preamble with Double Lengths," filed Oct. 16, 2009, the entire disclosure of which is hereby expressly incorporated herein by reference.

FIELD OF TECHNOLOGY

The present disclosure relates generally to communication systems and, more particularly, to information formats for exchanging information via communication channels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technology is described in detail in several IEEE standards documents, including for example, the IEEE Standard 802.11b (1999) and its updates and amendments, as well as the IEEE 802.15.3 Draft Standard (2003) and the IEEE 802.15.3c Draft D0.0 Standard, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, transmission systems compliant with the IEEE 802.15.3c or future IEEE 802.11ad standards support one or both of a Single Carrier (SC) mode of operation and an Orthogonal Frequency Division Multiplexing (OFDM) mode of operation to achieve higher data transmission rates. For example, a simple, low-power handheld device may operate only in the SC mode, a more complex device that supports a longer range of operation may operate only in the OFDM mode, and some dual-mode devices may switch between SC and OFDM modes. Additionally, devices operating in such systems may support a control mode of operation at the physical layer of the protocol stack, referred to herein as "control PHY." Generally speaking, control PHY of a transmission system corresponds to the lowest data rate supported by each of the devices operating in the transmission system. Devices may transmit and receive control PHY frames to communicate basic control information such as beacon data or beamforming data, for example.

In wideband wireless communication systems that operate in the 60 GHz band, packets transmitted via a communication channel generally include a PHY preamble to provide synchronization and training information; a PHY header to provide the basic parameters of the physical layer such as length of the payload, modulation and coding method, etc.; and a PRY payload portion. A PHY preamble consistent with the IEEE 802.15.3c Draft D0.0 Standard, for example, includes a synchronization field (SYNC) that has several repetitions of a certain spreading sequence to indicate the beginning of a block of transmitted information, a start frame delimiter (SFD) field to signal the beginning of the actual frame, and a channel estimation sequence (CES) to carry information for receiver algorithms related to automatic gain control (AGC) setting, antenna diversity selection, timing acquisition, coarse frequency recovery, channel estimation, etc.

In general, antennas and, accordingly, associated effective wireless channels are highly directional at frequencies near or above 60 GHz. When multiple antennas are available at a transmitter, a receiver, or both, it may be important to apply efficient beam patterns to the antennas to better exploit spatial selectivity of the corresponding wireless channel. Generally speaking, beamforming or beamsteering creates a spatial gain pattern having one or more high gain lobes or beams (as compared to the gain obtained by an omni-directional antenna) in one or more particular directions, with reduced gain in other directions. If the gain pattern for multiple transmit antennas, for example, is configured to produce a high gain lobe in the direction of a receiver, better transmission reliability can be obtained over that obtained with an omni-directional transmission.

However, before a pair of devices complete a beamforming training session or estimate the communication channel between the devices so as to generate beamsteering vectors, typically one or both devices omni-directionally transmit control PHY data units (e.g., packets). Generally speaking, it is difficult for a device receiving control PHY data units in this manner to develop optimal or near-optimal antenna weights or obtain accurate frequency and/or timing synchronization.

SUMMARY

According to an embodiment, in a wireless communication system where communication devices exchange information utilizing physical layer (PHY) data units that conform to a first format, where the first format includes a short training field (STF) that includes exactly N repetitions of a spreading sequence, a method for generating a PHY data unit that conforms to a second format, where the second format has a longer STF than the first format, includes generating an STF of the PHY data unit that includes M instances of the spreading sequence, where M is greater than N, and generating a channel estimation field (CEF).

In another embodiment, a method for processing a preamble of a data unit received via a communication channel, where the preamble includes a short training field (STF) and a channel estimation field (CEF), includes receiving the STF that includes a plurality of instances of a spreading sequence, determining if the plurality of instances of the spreading sequence consists of a first number of instances, processing the preamble according to a first format if the plurality of instances of the spreading sequence consists of the first number of instances, and processing the preamble according to a second format if the plurality of instances of the spreading sequence consists of a second number of instances, where the second number is greater than the first number.

In another embodiment, a communication device for use in a wireless communication system, where the communication device exchanges information with other communication devices utilizing data units that conform to a first format, where the first format includes a short training field (STF) that includes exactly N repetitions of a spreading sequence, includes a PHY data unit generator configured to generate an STF of a PHY data unit that includes M instances of the spreading sequence to conform to a second format, wherein M is greater than N, and generate a channel estimation field (CEF).

DETAILED DESCRIPTION

Figure 1:
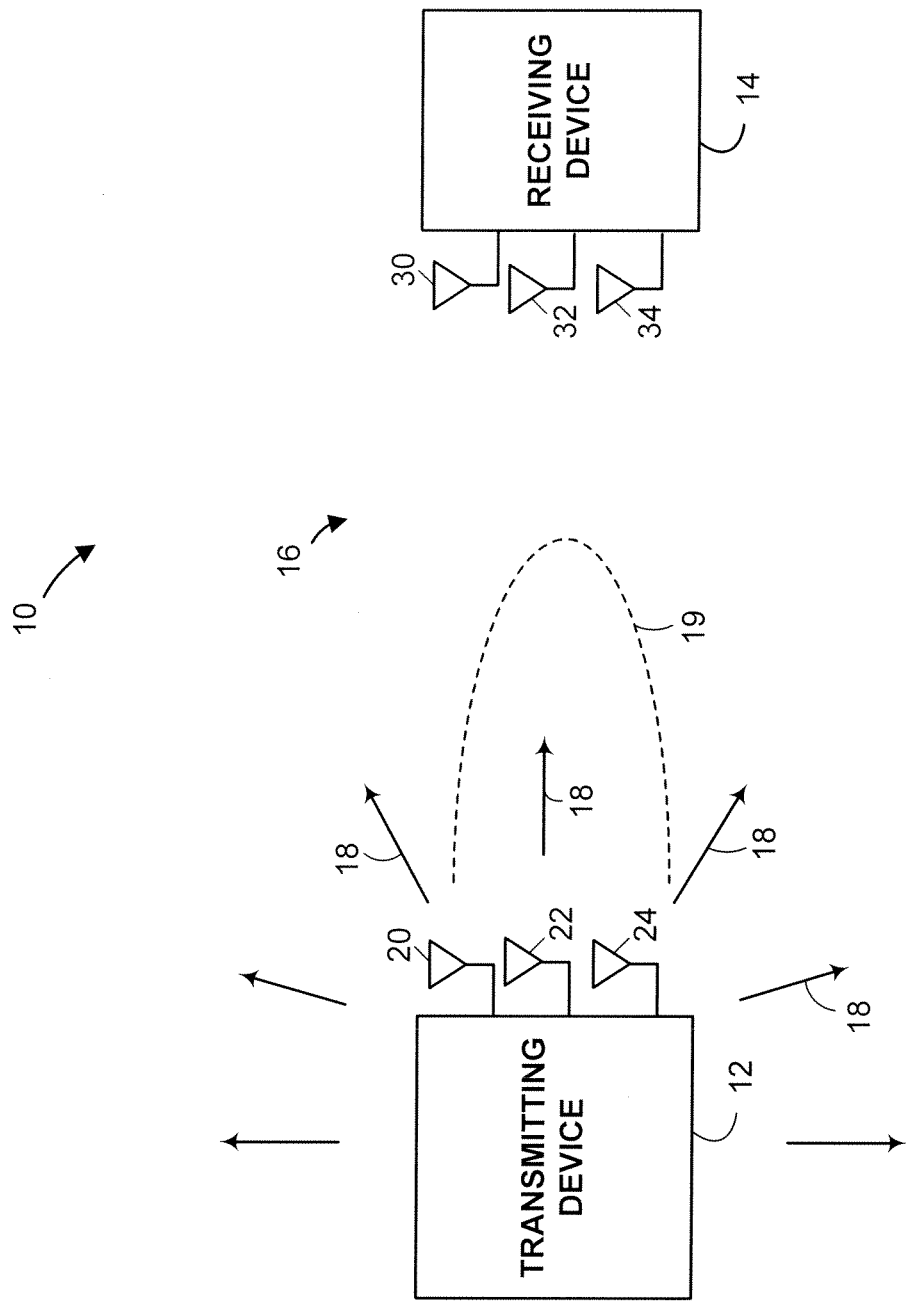
FIG. 1 is a block diagram of a communication system including a pair of devices that use physical layer (PHY) data units that conform to an extended format in accordance with one embodiment of the present disclosure.

FIG. 1 is a block diagram of an example wireless communication system 10 in which communicating devices, such as a transmitting device 12 and a receiving device 14, transmit and receive data units (e.g., packets) via a shared wireless communication channel 16. In an embodiment, the devices 12 and 14 communicate according to a communication protocol that utilizes different control PHY packet formats depending on the mode of operation. For example, when the receiving device 14 is not configured (or does not wish) to receive extended training information, control PHY data units that conform to a first format are utilized, whereas if the receiving device 14 is configured and wishes to receive extended training information, control PHY data units that conform to a second format are utilized. For convenience, the first and the second formats are referred to herein as the "regular" format and the "extended" format, respectively.

In an embodiment, the devices 12 and 14 utilize control PHY data units that conform to the extended format (hereinafter, "extended control PHY data units") when the devices 12 and 14 have not yet established a beamformed link. For example, extended control PHY data units 18 are transmitted in an omni-directional or quasi omni-directional mode, i.e., forming a spatial gain pattern that is approximately uniform in all directions. As used hereinafter, the term "omni-directional" also encompasses "quasi omni-directional." By contrast, upon developing a transmit (Tx) beamsteering vector for use in transmitting data units to the receiving device 14, the transmitting device 12 uses the developed beamsteering vector to create a spatial gain pattern that includes a lobe 19 extending in the direction of the receiving device 14. As discussed in more detail below, the extended control PHY data units 18 include additional instances of spreading sequences so as to allow the receiving device 14 to perform one or more of the following, for example: more accurately determine the direction from which the extended control PHY data units 18 are received, improve the receive gain for the extended control PHY data units 18 as well as other data units subsequently received from the transmitting device 12, improve the synchronization of frequency and/or timing of communications between the devices 12 and 14, etc., according to an embodiment.

Depending on the embodiment, the devices 12 and 14 are mobile or non-mobile stations equipped with a set of one or more antennas 20-24 and 30-34, respectively. Although the wireless communication system 10 illustrated in FIG. 1 includes two devices 12, 14, each with three antennas, the wireless communication system 10 in other embodiments includes any suitable number of devices, each equipped with the same or a different number of antennas (e.g., 1, 2, 3, 4 antennas and so on). For beamforming, however, at least one of the devices 12, 14 generally should include more than one antenna. Also, although the wireless communication system 10 illustrated in FIG. 1 includes a transmitting device 12 and a receiving device 14, devices in the wireless communication system 10 in at least some of the embodiments operate in multiple modes (e.g., a transmit mode and a receive mode). Accordingly, in some embodiments, antennas 20-24 and 30-34 support both transmission and reception. However, in another embodiment, a given device includes separate transmit antennas and separate receive antennas. Because each of the devices 12 and 14 may have a single antenna or multiple antennas, the wireless communication system 10 can be a multiple input, multiple output (MIMO) system, a multiple input, single output (MISO) system, or a single input, multiple output (SIMO) system.

The communication system 10 in various embodiments includes SC-only, OFDM-only, or dual-mode (SC and OFDM) devices. To enable any device operating in the communication system 10 to transmit and receive at least control PHY packets, in an embodiment, modulation of control PHY is preferably selected to match the slowest data rate (i.e., SC) supported in the communication system 10. In other words, because each OFDM device typically is capable of processing at least control PHY packets associated with an SC mode, modulating control PHY packets using an SC mode generally provides any device with access to control PHY messaging. In other embodiments, each device operating in the communication system 10 is an OFDM device, and modulation of control PHY is selected to match an OFDM modulation scheme, if desired. In yet other embodiments, the communication system 10 includes only SC devices, and control PHY modulation is accordingly limited to an SC mode only.

Figure 2:
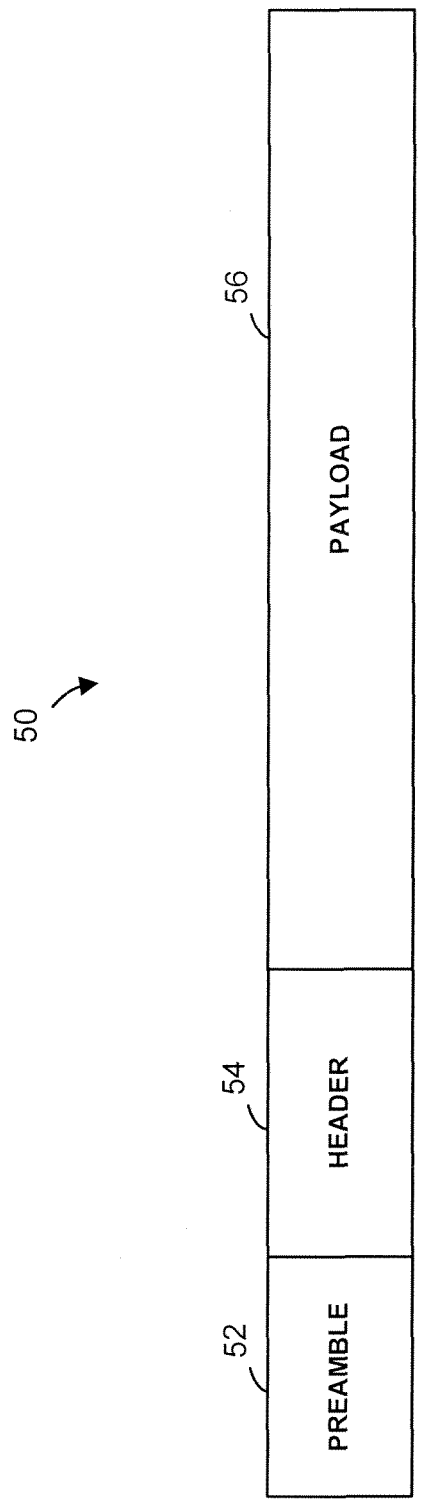
FIG. 2 is a block diagram of a known format of a data unit that devices utilize in communication systems similar to the communication system of FIG. 1.

FIG. 2 is a diagram of a prior art PHY packet format 50 consistent with the IEEE 802.15.3c Draft D0.0 Standard, for example. The packet 50 includes a preamble 52, a header 54, and a payload 56. Generally speaking, the preamble 52 provides training information that helps a receiver (e.g., the receiving device 14 of FIG. 1) to detect the packet 50, adjust an automatic gain control (AGC) setting, obtain frequency and timing synchronization, etc. As is also specified by the IEEE 802.15.3c Draft D0.0 Standard, the header 54 provides information of the basic PHY parameters required for decoding the payload 56 and/or receiving a subsequent packet (e.g., a length of the payload, modulation/coding method, pilot insertion information, cyclic prefix length in OFDM mode, preamble length of the next packet, reserved fields, etc.) so that the receiver can adjust its decoding apparatus accordingly. The header 54 also includes MAC layer information.

As described in detail in the U.S. patent application Ser. No. 12/569,547, entitled "Physical Layer Data Unit Format" and filed on Sep. 29, 2009 (hereinafter referred to as "the '547 application"), the entire disclosure of which is hereby incorporated by reference herein, control PHY packets can be distinguished from other PHY packets based on a modified spreading of a preamble or by a different spreading code applied to a portion of the preamble, in some embodiments. Further, as described in the above-identified application, boundaries between portions of the PHY preamble can be signaled using different spreading sequences, different polarities applied to the spreading sequences (to define different cover codes, for example), etc. It will be understood that these techniques can be used with the example formats of "regular" control PHY packets and extended control PHY packets described next with reference to FIGS. 3A, 4A and 4B, 4B, respectively.

Figure 3:
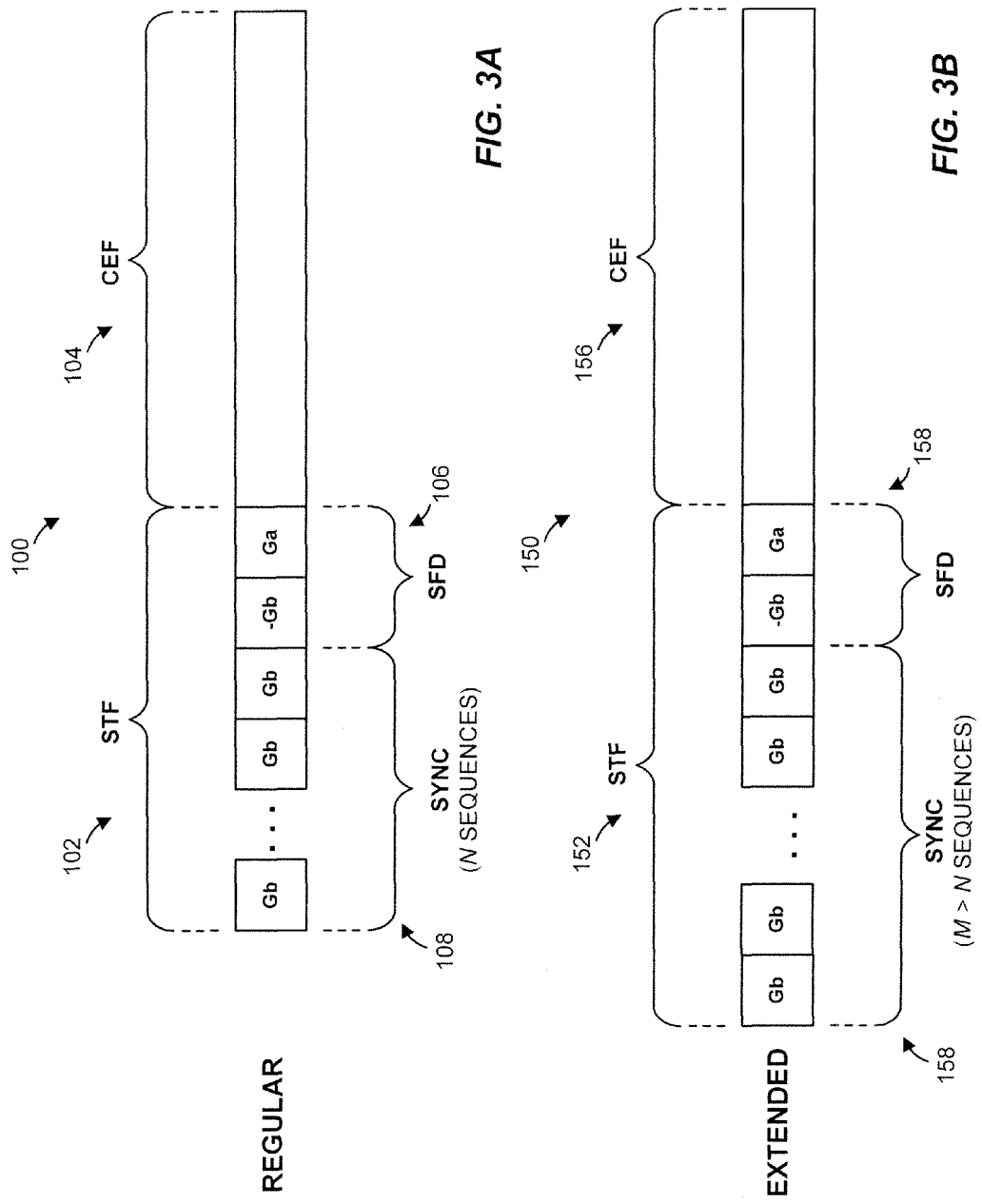
FIGS. 3A and 3B are diagrams of a preamble of a control PHY data unit that conforms to a first format or a second format, respectively, in an embodiment of the present disclosure.

Referring first to FIG. 3A, an example format 100 of a preamble of a regular control PHY packet includes a short training field (STF) 102 and a channel estimation field (CEF) 104, according to an embodiment. In a typical embodiment, the STF 102 includes information that is useful for synchronization, whereas the CEF 104 includes information that is useful for channel estimation. For example, in an embodiment, the STF 102 includes a synchronization (SYNC) sequence, and the CEF 104 includes a channel estimation sequence (CES). In the embodiment depicted in FIG. 3A, the STF 102 also includes a start frame delimiter (SFD) sub-field 106 to signal the beginning of the actual CEF 104.

In an embodiment, the SYNC sequence 108 is made up of N Golay sequences Gb. As is known, the sum of out-of-phase aperiodic autocorrelation coefficients of the Golay sequence Gb and a corresponding complementary Golay sequence Ga is zero. It is also known that the complementary Golay sequences Ga and Gb have aperiodic cross-correlation with a narrow main lobe and low-level side lobes. Accordingly, the Golay sequence Ga or Gb is suitable for detection at a receiving device. In an embodiment, the sequences Ga and Gb are length-128 sequences. In other embodiments, however, the sequences Ga and Gb are of some other suitable length. For example, in an embodiment, a composite Golay sequence Gm is composed of several Golay sequences (e.g., {Ga, Gb}), and the SYNC sequence 108 is made up of N Golay sequences Gm. Further, spreading sequences other than Golay sequences (preferably having correlation properties suitable for detection at a receiving device) are used in other embodiments of the preamble that conforms to the format 100.

With continued reference to FIG. 3A, the CEF 104 includes channel estimation symbols (CES) and, depending on the embodiment, cyclic postfix and/or prefix fields. In an embodiment, each of the CES symbols is composed of a certain pattern of the sequences Ga and Gb modified by a cover code. As used herein, the term "cover code" refers to how a series of sequences are augmented to form a longer sequence. For example, for a sequence [−b, +a, +b, +a], where a and b are complementary sequences, the cover code can be represented as [−1, +1, +1, +1], where −1 indicates that the binary complement of the code a or b is utilized, or that the modulated signal corresponding to code −a, for example, is phase shifted by 180° with respect to the modulated signal corresponding to code +a. In other words, the spreading sequence −a has the opposite polarity relative to the spreading sequence +a. In the example [−b, +a, +b, +a], the cover code could be represented differently, such as [0, 1, 1, 1], where the first 0 indicates that −b is utilized. For convenience, the "plus" sign is omitted in the examples below, and pairs of Golay sequences having opposite polarities are designated simply as Ga and −Ga (or Gb and −Gb), for example.

To indicate that a series of N spreading sequences is completed, the SFD sub-field 106 immediately follows the SYNC sequence 108, so that the last spreading sequence Gb of the SYNC sequence 108 immediately precedes the first spreading sequence −Gb of the SFD sub-field 106, according to an embodiment. By detecting the change in polarity and, accordingly, the transition from the Golay sequence Gb to the Golay sequence −Gb, the receiving device determines that every Golay sequence in the SYNC sequence 108 has been transmitted. In another embodiment, the first spreading sequence of the SFD sub-field 106 includes a complementary sequence Ga, so that the receiving device determines that every Golay sequence in the SYNC sequence 108 has been transmitted by detecting a transition from the Golay sequence Gb to its complement Ga. Further, in some embodiments, the SYNC sequence 108 includes N instances of the Golay sequence Ga, and the first spreading sequence of the SFD sub-field 106 is the complementary Golay sequence Gb or the Golay sequence Ga with the opposite polarity, i.e., −Ga.

Now referring to FIG. 3B, in an embodiment, an extended control PHY packet that conforms to a format 150 includes an STF 152, in which a SFD sub-field 156 immediately follows a SYNC sequence 158, and a CEF 154. In an embodiment, the SYNC sequence 158 is made up of M Golay sequences Gb, such that M is larger than N (which is the number of instances of the sequence Gb in the SYNC sequence 108 according to the format 100). For example, in some embodiments, M is equal to 2N. In one such embodiment, N is equal to 38, and M accordingly is equal to 76. In general, M can be equal to other values greater than N (e.g., 3N, 4N, N+X, where X is an integer such as 5 or some other suitable integer, etc.)

Similar to the format 100 discussed above, the SYNC sequence 158 in other embodiments includes several instances of the spreading sequence Ga or the sequence Gb with the negative polarity (i.e., −Gb), for example, rather than the sequence Gb with the positive polarity (i.e., +Gb). Thus, in an embodiment, the formats 100 and 150 are similar except for the number of instances of a spreading sequence in the corresponding SYNC sequence.

In an embodiment, devices operating in a communication system selectively utilize control PHY packets that conform to the format 100 or the format 150, so that at least some of the devices support both formats. Referring back to FIG. 1, for example, the transmitting device 12 determines the capability of the receiving device 14 based on previously received information (e.g., information transmitted during a beacon time (BT) timeslot or association beamforming training (A-BFT) timeslot) and selects the format 100 or the format 150 in view of the capability of the receiving device 14, according to an embodiment. In this case, if the receiving device 14 is not configured to process control PHY packets that include more than N instances of a spreading sequence in the STF, the transmitting device 12 formats a control PHY packet according to the format 100 even if the transmitting device 12 determines that the format 150 otherwise would be more appropriate. In an embodiment, the transmitting device 12 determines whether the format 100 or the format 150 should be used further in view of the ability of the receiving device 14 to conduct receive (Rx) antenna training. In one such scenario, the receiving device 14 does not support a separate beamforming training protocol and relies mostly or exclusively on the training information included in the preamble of a control PHY packet.

In an embodiment, the transmitting device 12 determines whether the format 100 or the format 150 should be used also in view of the state of the communication link (e.g., beamformed, unbeamformed) between the devices 12 and 14, and selects the format 150 if beamforming information is unavailable or insufficient to reliably generate a beamsteering vector. As indicated above, control PHY packets typically are transmitted omni-directionally over an unbeamformed link.

Referring still to FIGS. 1, 3A, and 3B, the transmitting device 12 in some embodiments actively solicits control PHY capability information from the receiving device 14 to determine whether the format 150 can be used, when appropriate, to transmit control information to the receiving device 14. In another embodiment, the receiving device 14 advertizes its control PHY processing capability and unconditionally transmits this information to potential peer devices. As just one example, one or both of the devices 12 and 14 transmit packets that include a piconet basic service set (PBSS) field or a similar PHY or MAC field to specify capability information, according to an embodiment.

Figure 4:
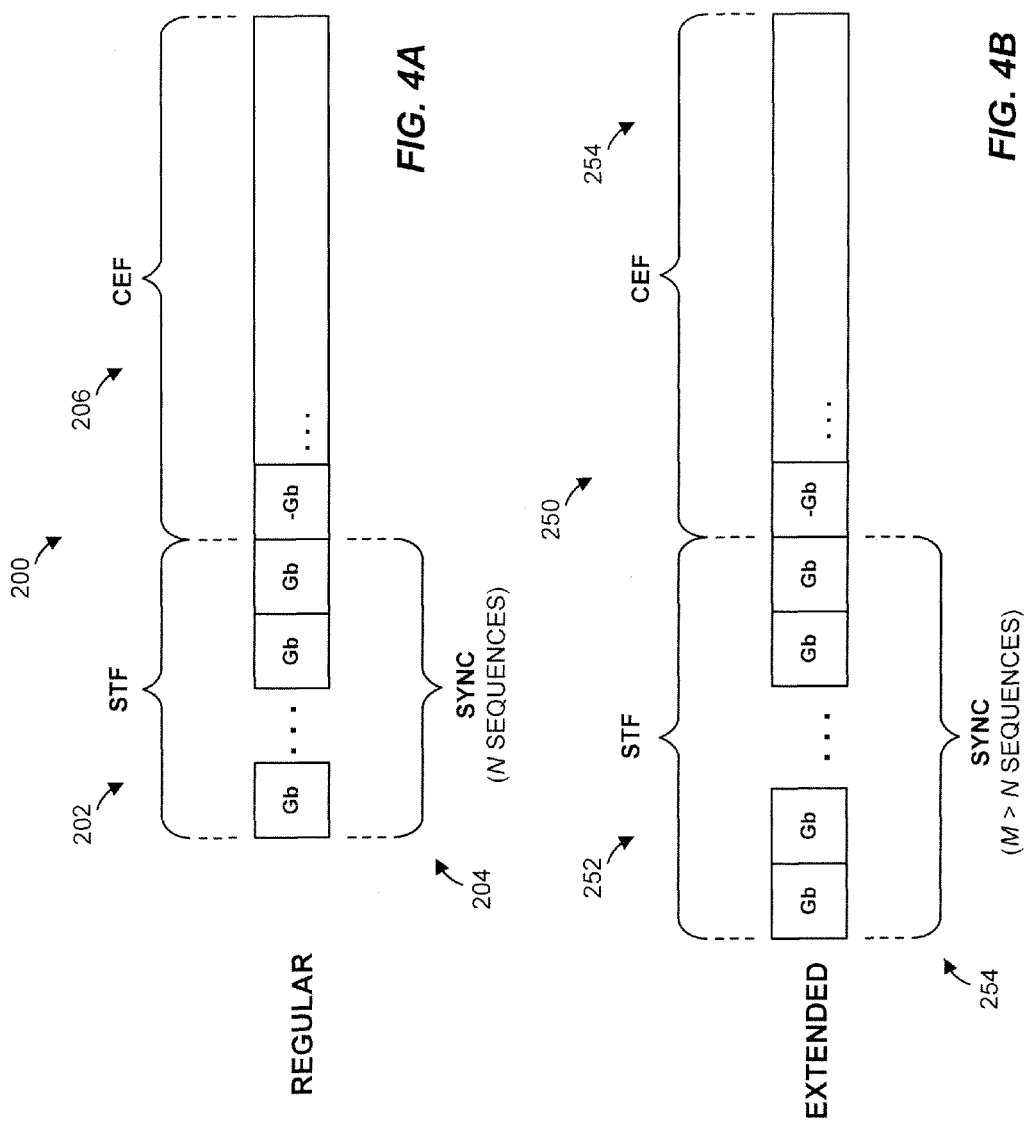
FIGS. 4A and 4B are diagrams of a preamble of a control PHY data unit that conforms to a first format or a second format, respectively, in another embodiment of the present disclosure.

Now referring to FIG. 4A, an example format 200 of a regular control PHY packet is generally similar to the format 100 illustrated in FIG. 3A. In an embodiment, the format 200 includes an STF 202 fully aligned with a SYNC sequence 204, and a CEF 206. However, a control PHY packet consistent with the format 200 does not include an SDF field, and the boundary between the STF 202 and the CEF 206 is signaled by the difference in polarity between the Golay sequence Gb, occurring as the last instance of a spreading sequence in the SYNC sequence 204, and the Golay sequence –Gb, occurring as the first instance of a spreading sequence in the CEF 206, according to an embodiment. In other words, the Golay sequence –Gb in this embodiment immediately follows the Golay sequence Gb to indicate the end of the SYNC sequence 204. As discussed more fully in the '547 application incorporated by reference above, the Golay sequence –Gb occurring at the beginning of the CEF 206 in some embodiments advantageously serves both as a delimiter between the CEF 206 and the STF 202 and as a portion of a CES. In other embodiments, the boundary between the STF 202 and the CEF 206 is signaled by complementary sequences such as Golay sequences Ga and Gb, for example. It is noted that in the embodiment depicted in FIG. 4A, the STF 202 consists only of the SYNC sequence 204.

In an embodiment, the SYNC sequence 204 includes N instances of a spreading sequence such as the Golay sequence Gb. By contrast, an extended control PHY packet consistent with a format 250 of FIG. 4B includes a SYNC sequence 254 that is made up of M instances of the same sequence (e.g., Gb), where M is greater than N, according to an embodiment. For example, in an embodiment, M is equal to 2N, although in general M can be equal to other values greater than N (e.g., 3N, 4N, N+X, where X is an integer such as 5 or some other suitable integer, etc.). As further illustrated in FIG. 4B, the format 250, in an embodiment, includes an STF 252 and a CEF 254 but no SFD sub-field, with the transition between the STF 252 and CEF 254 being signaled by Golay sequences having opposite polarities (as is also the case in the format 200).

In an embodiment, a pair of devices utilize the formats 200 and 250 depending on device capability and/or on whether the communication link between the two devices is beamformed or unbeamformed. For example, in an embodiment, the devices 12 and 14 discussed above with reference to FIG. 1 use the formats 200 and 250 instead of (or in addition to) the formats 100 and 150 discussed above.

In some embodiments, an extended control PHY packet includes a longer CEF in addition to (or instead of) a longer STF. For example, in an embodiment, an extended control PHY packet includes twice as many channel estimation symbols in the CEF relative to a regular control PHY packet. In some embodiments, the CEF of a regular control PHY packet includes N' channel estimation symbols, and the CEF of an extended control PHY packet includes aN' channel estimation symbols, where a is an integer such as 2, 3, 4, etc., or N'+X' channel estimation symbols, where X' is an integer such as 5 or some other suitable integer, for example.

Figure 5:
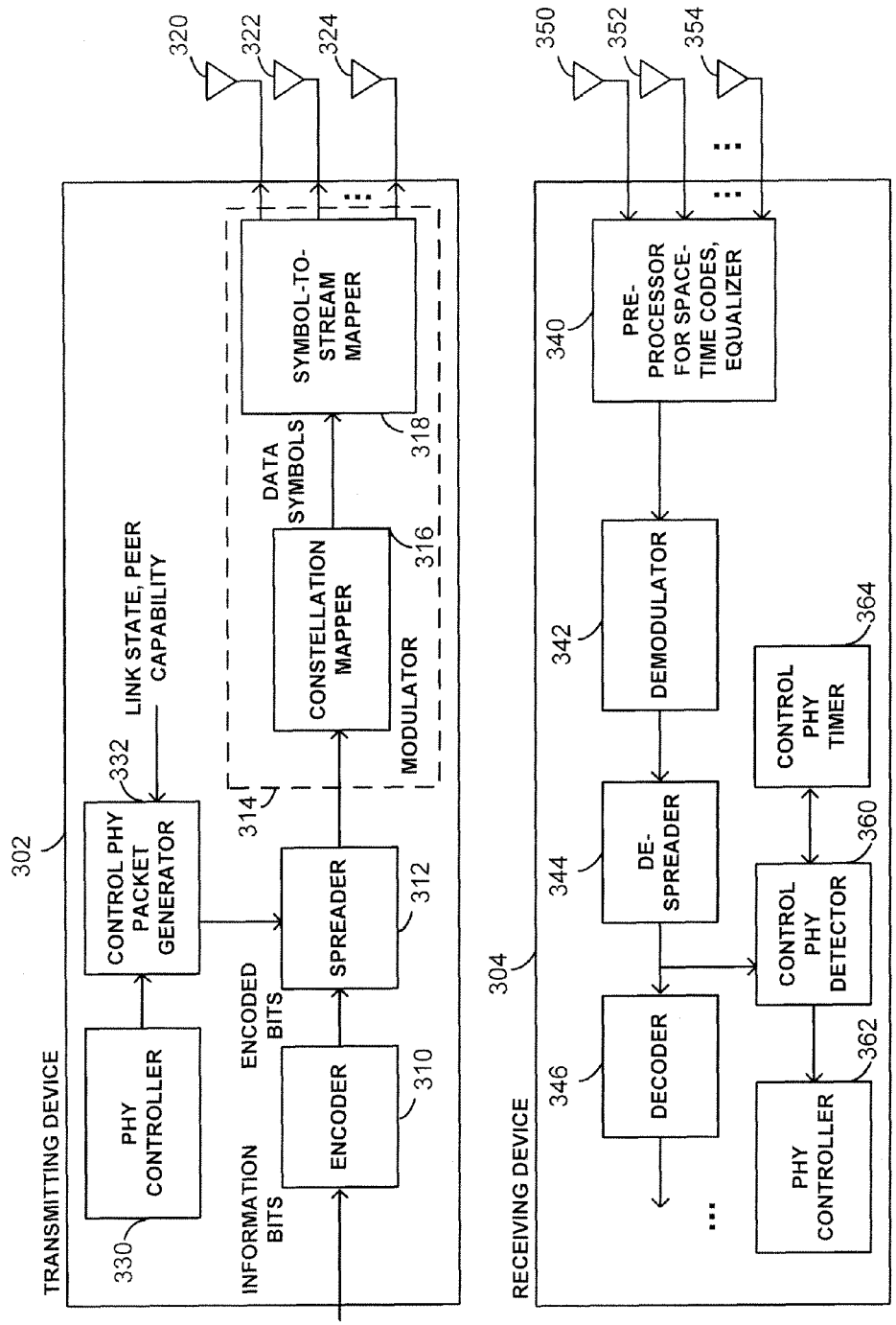
FIG. 5 depicts block diagrams of a transmitter and a receiver that operate in the system of in FIG. 1, according to an embodiment of the present disclosure.

Next, FIG. 5 illustrates, in relevant part, example architectures of a transmitting device 302 and a receiving device 304 that are used in the transmitting device 12 and the receiving device 14, respectively, in an embodiment of the present disclosure. The transmitting device 302 generally converts a sequence of information bits into signals appropriate for transmission through a wireless channel (e.g., channel 16 of FIG. 1), according to an embodiment. In an embodiment, the transmitting device 302 includes an encoder 310 (e.g., a convolution encoder) that encodes information bits, a spreader 312 that converts each encoded bit to a sequence of chips, and a modulator 314 that modulates the encoded chips into data symbols, which are mapped and converted to signals appropriate for transmission via one or more transmit antennas 320-324. In at least some of the embodiments, the modulator 314 implements any suitable modulation techniques based on one or more of phase shift keying, binary phase-shift keying (BPSK), π/2 BPSK (in which modulation is rotated by π/2 for each symbol or chip so that the maximum phase shift between adjacent symbols/chips is reduced from 180° to 90°), quadrature phase-shift keying (QPSK), π/2 QPSK, frequency modulation, amplitude modulation, quadrature amplitude modulation (QAM), π/2 QAM, on-off keying, minimum-shift keying, Gaussian minimum-shift keying, dual alternative mark inversion (DAMI), etc. Further, in some embodiments, the modulator 314 includes a bit-to-symbol mapper 316 that maps encoded bits into symbols, and a symbol-to-stream mapper 318 that maps the symbols into multiple parallel streams. If only one transmit antenna is utilized, the symbol-to-stream mapper 318 can be omitted. Information is transmitted in data units such as packets, according to an embodiment.

The transmitting device 302 includes a control PHY controller 330 that generally controls transmission and reception of regular and control PHY data units, in an embodiment. For example, the control PHY controller 330 in an embodiment uses MAC-level data to determine whether a regular PHY data unit or a control PHY data unit should be used. For example, packets transmitted during a beamforming training (BFT) period conform to a control PHY format that is different from the format of non-control (regular) PHY packets, in an embodiment.

With continued reference to FIG. 5, the transmitting device 302 also includes a control PHY packet generator 332 that generates control PHY packets using one of the two formats 100 or 150, in accordance with one embodiment, or 200 or 250, in accordance with another embodiment. In an embodiment, the control PHY packet generator 332 receives information regarding the status of the communication link (e.g., beamformed, unbeamformed) over which the transmitting device 302 is to transmit control PHY packets and, in some cases, peer capability information to determine whether the peer device is capable of receiving extended control PHY packets consistent with the format 150 or 250, for example. In view of this information, the control PHY packet generator 332 directs the spreader 312 to generate the proper number (e.g., N, M) of instances of a spreading sequence (e.g., Golay sequence Ga or Gb) when generating a SYNC sequence, for example. In an embodiment, the control PHY packet generator 332 also directs the spreader 312 to generate different numbers of instances of a spreading sequence when formatting other portions of a PHY preamble (e.g., the CEF) of a packet, depending on whether the packet is a regular control PHY packet or an extended control PHY packet.

Depending on the embodiment, the transmitting device 12 includes various additional modules that, for purposes of clarity and conciseness, are not illustrated in FIG. 5. For example, in various embodiments, the transmitting device 302 includes an interleaver that interleaves the encoded bits to mitigate burst errors, a radio frequency (RF) front end for performing frequency upconversion, various filters, power amplifiers, and so on. Further, while FIG. 5 illustrates a control PHY packet generator 332 dedicated specifically to controlling during transmission/reception of control PHY packets and generating control PHY packets, the transmitting device 302 in some embodiments includes one or several controllers associated with respective control PHY procedures (such as BFT, beacon transmission, etc.) communicatively coupled to a control PHY packet generator.

With continued reference to FIG. 5, the receiving device 304 includes a pre-processor for space-time codes and equalizer 340 coupled to one or more receive antennas 350-354, a demodulator 342, a despreader 344, and a decoder 346, according to an embodiment. In an embodiment, the receiving device 304 also includes a control PHY packet detector 360 to detect portions of a PHY preamble and a control PHY controller 362 that generally controls operation during reception and/or transmission of control PHY packets. For example, the control PHY controller 362 in one embodiment includes a BFT controller (not shown) that controls operation during a BFT period.

During operation, the control PHY packet detector 360 processes received spreading sequences to determine when portions of a control PHY preamble begin and end, according to an embodiment. For example, in an embodiment, the control PHY packet detector 360 detects the beginning of a packet as a first instance of a certain spreading sequence (e.g., Golay sequence Gb) and counts the number of instances of the sequence until a change in the spreading sequence and/or the polarity of the spreading sequence is detected. For example, when detecting the preamble of a control PHY packet consistent with the format 100, the control PHY packet detector 360 detects the first instance of the Golay sequence Gb of the SYNC sequence 108, increments a counter each time a new instance of the Golay sequence Gb is detected, and stops incrementing the counter when the Golay sequence −Gb, occurring at the beginning of the SFD subfield 106, according to an embodiment. In another embodiment, the control PHY packet detector 360 generates a first timestamp when the first instance of the Golay sequence Gb is received, generates a second timestamp when a different spreading sequence (e.g., −Gb) is received, and compares the two timestamps to determine the number of instances of the spreading sequence in the SYNC sequence 108.

In another embodiment, the control PHY timer controller 364 activates a timer when the first instance of the Golay sequence Gb is received, so that the expiration period of the timer is equal to the duration of N instances of the spreading sequence. When the timer expires, the control PHY packet detector 360 determines whether the series of N spreading sequences of the SYNC 108 is completed, in an embodiment. If the series is not completed, the control PHY packet detector 360 decides that the preamble of the control PHY packet in fact conforms to the format 150. Otherwise, if the series is completed, the control PHY packet detector 360 decides that the preamble of the control PHY packet conforms to the format 100.

In another embodiment, a module similar to the control PHY packet detector 360 processes portions of both regular PHY preambles and control PHY preambles. Also, in some embodiments, the receiving device 304 further includes other components such as filters, analog-to-digital converters, etc. that are omitted from FIG. 5 for the purposes of clarity and conciseness.

Similar to the transmitting device 302, the receiving device 304 in some embodiments includes components for processing control PHY packets in addition to, or in instead of, the control PHY packet detector 360 and the control PHY controller 362. In an embodiment, the control PHY packet detector 360 is coupled to a BFT controller, a beacon controller, and other components associated with respective control PHY procedures, or the control PHY controller may include the BFT controller, the beacon controller, etc.

Figure 6:
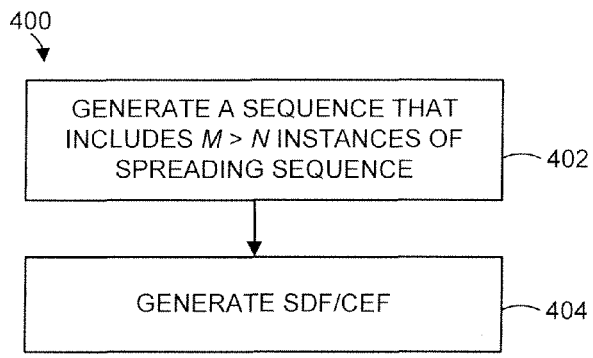
FIG. 6 is a flow diagram of a method for generating an extended control PHY preamble, in an embodiment of the present disclosure.
Figure 7:
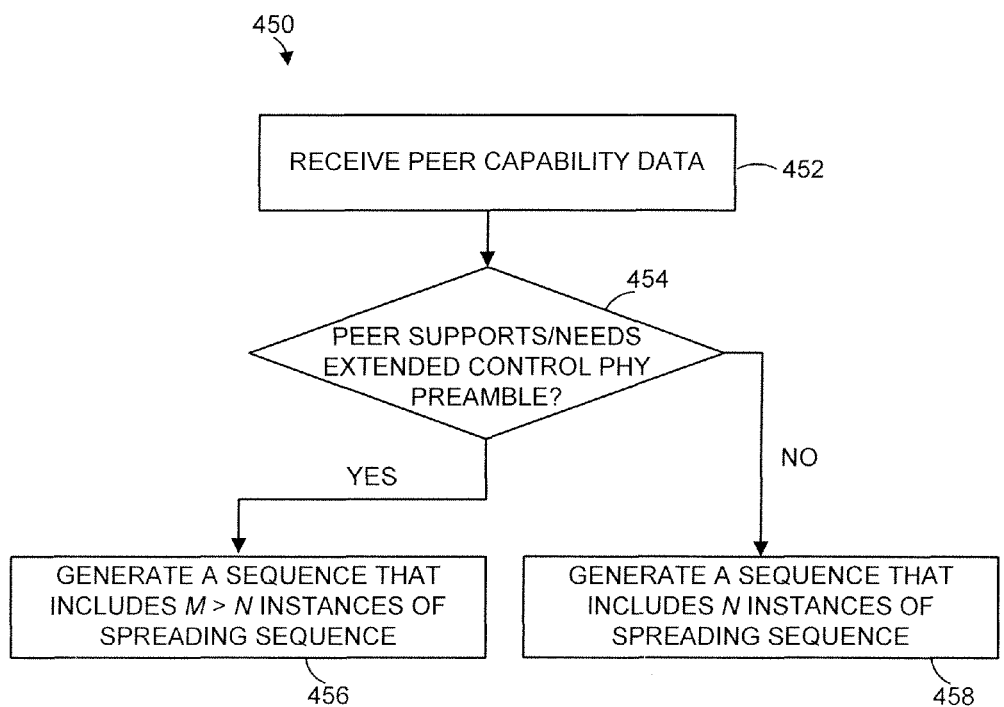
FIG. 7 is a flow diagram of a method for selectively generating a regular control PHY preamble or an extended control PHY preamble, in another embodiment of the present disclosure.
Figure 8:
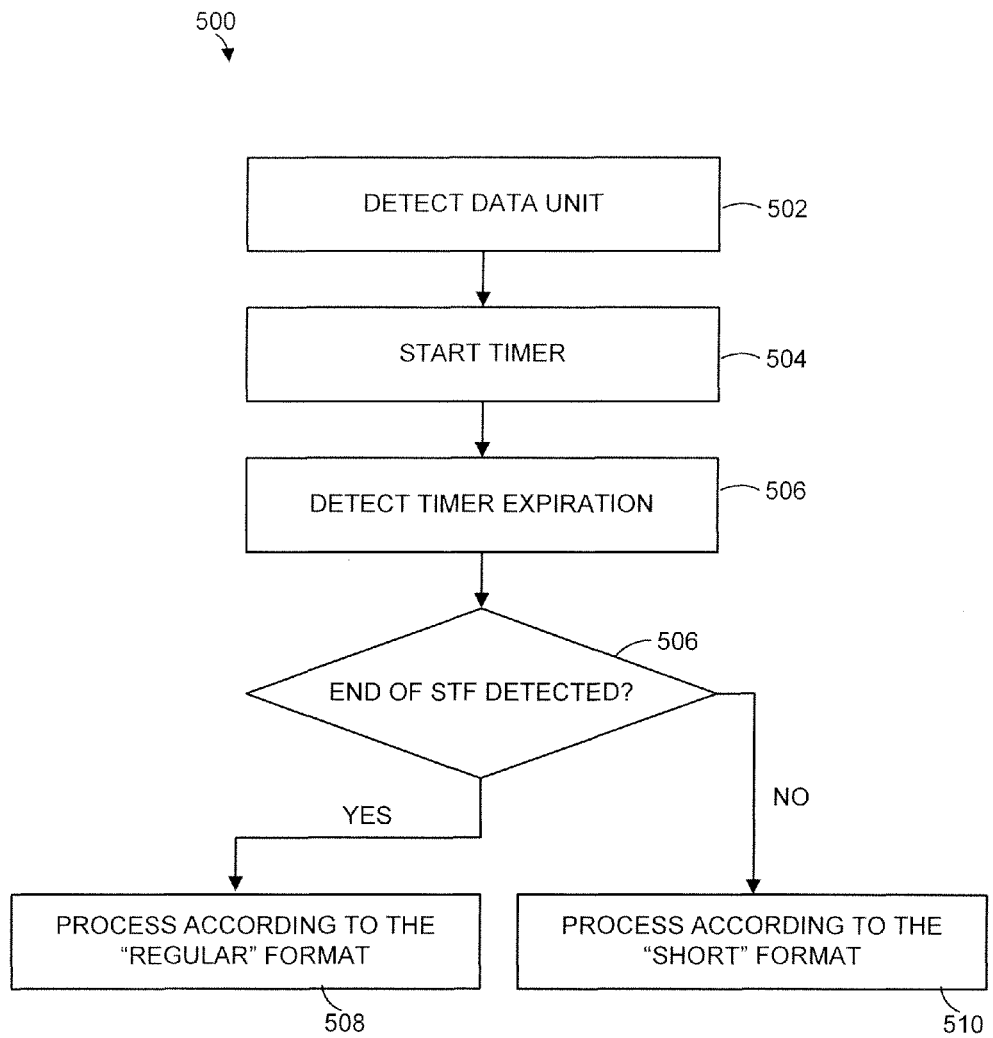
FIG. 8 is a flow diagram of a method for processing a control PHY preamble, in another embodiment of the present disclosure.

Now referring to FIGS. 6-8, at least some of the components illustrated in FIG. 5 implement example methods 400, 450, and 500, in various embodiments. For example, in an embodiment, the PHY controller 330 and the control PHY packet generator 332 implement the method 400 for generating an extended control PHY preamble. Further, in an embodiment, the PHY controller 330 and the control PHY packet generator 332 implement the method 450 for selectively generating a regular control PHY preamble or an extended control PHY preamble. The control PHY detector 360 and the control PHY timer 364 implement the method 500 for processing a control PHY preamble that conforms to a regular format or an extended format, in an embodiment of the present disclosure.

Referring first to FIG. 6, at block 402, M instances of a spreading sequence are generated to produce a SYNC sequence of an extended control PHY packet, according to an embodiment. Compared to a regular control PHY packet that includes N instances of a spreading sequence in the SYNC sequence, where M>N, the preamble of the extended control PHY packet provides additional training information to improve frequency and/or timing synchronization, allow the receiving device to more accurately determine weights in an antenna array vector (e.g., an Rx beamforming vector), etc. Next, at block 406, other portions of the preamble are generated, including a CEF and, in some cases, an SDF. For example, if the format 150 depicted in FIG. 3B is used, both the SDF and a CEF are generated at block 406, whereas if the format 250 depicted in FIG. 4B is used, only the CEF is generated. In some embodiments, the CEF of the same duration is generated for both regular control PHY packets and extended control PHY packets. In other embodiments, the CEF of an extended control PHY packets includes a larger number of channel estimation symbols, and thus has a longer duration that the CEF of a regular control PHY packet.

Referring to FIG. 7, in an embodiment, a transmitting device implements the method 450 to selectively generate an STF in the preamble of a control PHY packet according to a regular format or an extended format in view of peer capability. At block 452, peer capability data is received, according to an embodiment. In some embodiments, peer capability specifies whether the peer is capable of processing an extended control PHY packet, whether the peer supports Rx antenna training, or both. Next, at block 454, it is determined whether the peer supports and/or needs additional training information provided in a preamble of an extended control PHY packet, in an embodiment. If it is determined that the peer supports and/or needs this information, a SYNC sequence made of M instances spreading sequences is generated (block 456), whereas if it is determined that the peer does not support or need this information, a SYNC sequence made of N instances spreading sequences is generated, where M>N, according to an embodiment.

According to the method 500 diagramed in FIG. 8, the beginning of a data unit, such as a control PHY packet, is detected at block 502. For example, in an embodiment, the first occurrence of a Golay sequence Gb is detected using correlation detection or another suitable technique. At block 504, a timer with the expiration period equal to the duration of N occurrences of a spreading sequence is activated (e.g., started or "armed"), and the corresponding timer expiration event is detected at block 506, according to an embodiment. Next, at block 510, it is determined whether the entire SYNC sequence has been received, or whether the beginning of a new portion of the preamble (such as the SFD field or the CEF) has been detected, in an embodiment. If the entire SYNC sequence has been received, the preamble and/or the rest of the control PHY packet is processed according to the regular format such as the format 100 or 200, for example (block 512). Otherwise, if the entire SYNC sequence has not yet been received, the preamble and/or the rest of the control PHY packet is processed according to the extended format such as the format 150 or 250, for example (block 514).

In an embodiment, a receiving device begins to conduct Rx antenna training and/or synchronization improvement upon the expiration of the timer at block 508 using the instances N+1, N+2, . . . M of the SYNC sequence if the receiving device supports an extended control PHY format. In another embodiment, the receiving device begins to conduct Rx antenna training and/or synchronization improvement upon receiving the first instance of a spreading sequence in the SYNC sequence.

In some embodiments, the techniques discussed above are used with regular PHY packets instead of (or in addition to) control PHY packets. Thus, non-control (e.g., regular) PHY packets are generated and processed using a regular format or an extended format, e.g., using N or M instances of a spreading sequence in one or several portions of the preamble.

At least some of the various blocks, operations, and techniques described above may be implemented utilizing hardware, a processor executing firmware instructions, a processor executing software instructions, or any combination thereof. For example, various blocks depicted in FIG. 5 are implemented using an application-specific integrated circuit (ASIC), according to one embodiment, or using a programmable field-gate array (FPGA), according to an embodiment.

When implemented utilizing a processor executing software or firmware instructions, the software or firmware instructions can be stored in any computer readable memory such as on a magnetic disk, an optical disk, or other storage medium, in a RAM or ROM or flash memory, processor, hard disk drive, optical disk drive, tape drive, etc. Likewise, the software or firmware instructions can be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions can be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions can include machine readable instructions that, when executed by the processor, cause the processor to perform various acts.

When implemented in hardware, the hardware can comprise one or more of discrete components, an integrated circuit, an ASIC, etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for processing a preamble of a control physical layer (PHY) data unit received via a communication channel, wherein the preamble includes a short training field (STF) and a channel estimation field (CEF), the method comprising:
receiving the STF that includes a plurality of instances of a spreading sequence;
determining if the plurality of instances of the spreading sequence consists of a first number of instances;
processing the preamble according to a first format if the plurality of instances of the spreading sequence consists of the first number of instances, wherein the first format corresponds to a default mode of the control PHY data unit transmission;
processing the preamble according to a second format if the plurality of instances of the spreading sequence consists of a second number of instances, wherein the second number is greater than the first number, and wherein the second format corresponds to an extended preamble mode of the control PHY data unit transmission; and
activating a timer when the first one of the plurality of spreading sequences is received, wherein the timer is associated with an expiration period equal to a duration of the first number of instances, and
wherein determining if the plurality of spreading sequences consists of the first number of instances includes checking whether all of the spreading sequences in the plurality of spreading sequences have been received upon expiration of the timer.

2. The method of claim 1, wherein:
the plurality of instances of the spreading sequence are contiguous, and
the second number of instances is twice the first number of instances.

3. The method of claim 1, further comprising:
determining an end of the STF based on receiving a start frame delimiter (SFD) field, and wherein the SFD field occurs immediately after the STF.

4. The method of claim 3, wherein the SFD field includes an instance of a spreading sequence complementary to a last instance in the plurality of instances of the spreading sequence of the STF.

5. The method of claim 1, the method further comprising:
causing an indication to be transmitted to another communication device that transmits the control PHY data unit, wherein the indication indicates that a communication device is capable of processing control PHY data units that conform to the second format.

6. The method of claim 1, wherein:
the control PHY data unit conforms to the second format, and
the control PHY data unit is received via an unbeamformed link.

7. The method of claim 1, wherein processing the preamble according to the second format includes conducting receive antenna training after the first number of instances of the spreading sequence have been received.

8. A method for processing a preamble of a control physical layer (PHY) data unit received via a communication channel, wherein the preamble includes a short training field (STF) and a channel estimation field (CEF), the method comprising:
receiving the STF that includes a plurality of instances of a spreading sequence;
determining if the plurality of instances of the spreading sequence consists of a first number of instances;
processing the preamble according to a first format if the plurality of instances of the spreading sequence consists of the first number of instances, wherein the first format corresponds to a default mode of the control PHY data unit transmission; and
processing the preamble according to a second format if the plurality of instances of the spreading sequence consists of a second number of instances, wherein the second number is greater than the first number, and wherein the second format corresponds to an extended preamble mode of the control PHY data unit transmission, and
wherein processing the preamble according to the second format includes conducting receive antenna training after the first number of instances of the spreading sequence have been received.

9. The method of claim 8, wherein:
the plurality of instances of the spreading sequence are contiguous, and
the second number of instances is twice the first number of instances.

10. The method of claim 8, further comprising:
determining an end of the STF based on receiving a start frame delimiter (SFD) field, and
wherein the SFD field occurs immediately after the STF.

11. The method of claim 10, wherein the SFD field includes an instance of a spreading sequence complementary to a last instance in the plurality of instances of the the spreading sequence of the STF.

12. The method of claim 8, the method further comprising:
causing an indication to be transmitted to another communication device that transmits the control PHY data unit, wherein the indication indicates that a communication device is capable of processing control PHY data units that conform to the second format.

13. The method of claim 8, wherein:
the control PHY data unit conforms to the second format, and
the control PHY data unit is received via an unbeamformed link.

* * * * *